(12) United States Patent
Watson

(10) Patent No.: US 7,689,868 B2
(45) Date of Patent: Mar. 30, 2010

(54) MEMORY HANDLING TECHNIQUES TO FACILITATE DEBUGGING

(75) Inventor: Brian Watson, Burlingame, CA (US)

(73) Assignee: Sony Computer Entertainment Inc., Foster City, CA (US)

( * ) Notice: Subject to any disclaimer, the term of this patent is extended or adjusted under 35 U.S.C. 154(b) by 430 days.

(21) Appl. No.: 11/767,399

(22) Filed: Jun. 22, 2007

(65) Prior Publication Data

US 2008/0320333 A1    Dec. 25, 2008

(51) Int. Cl.
*G06F 11/00* (2006.01)

(52) U.S. Cl. .......................... 714/34; 714/38; 717/124; 717/129

(58) Field of Classification Search .................. 714/34, 714/38; 717/124, 129
See application file for complete search history.

(56) References Cited

U.S. PATENT DOCUMENTS

| 5,611,043 | A  | * | 3/1997 | Even et al. ..................... 714/38 |
| 6,934,886 | B2 | * | 8/2005 | Ok ............................. 714/34 |
| 7,047,520 | B2 | * | 5/2006 | Moore et al. ................. 717/129 |
| 7,447,942 | B2 | * | 11/2008 | Chen et al. ..................... 714/38 |
| 2007/0033577 | A1 | * | 2/2007 | Arackal ....................... 717/124 |

* cited by examiner

*Primary Examiner*—Philip Guyton
(74) *Attorney, Agent, or Firm*—Steptoe & Johnson LLP

(57) ABSTRACT

A method for debugging includes interacting with a memory management component to force an interrupt upon access to one or more memory locations during software execution, and in response to the forced interrupt, saving information regarding the execution of the software, and interacting with the memory management component to disable the interrupt upon access to the one or more memory locations during software execution.

3 Claims, 2 Drawing Sheets

MEMORY HANDLING TECHNIQUES TO FACILITATE DEBUGGING

TECHNICAL FIELD

Briefly, and in general terms, this disclosure relates to memory handling techniques to facilitate software debugging.

BACKGROUND

General computing platforms and entertainment platforms (including computers, video game consoles, portable video game devices, cell phones, personal digital assistants ("PDAs") and the like) (hereinafter referred to generally as "processing platform") typically use a virtual memory address space that exceeds the platform's addressable physical random access memory (RAM). Using virtual memory provides many well known benefits.

A virtual memory addressing scheme enables a processor to perform operations (e.g., reads, writes, bitwise operations, arithmetic operations, and the like) using a virtual memory address that typically exceeds the processor's available random access memory ("RAM"). Such virtual memory addresses are translated to physical addresses using a memory management system. For example, a processing platform may include a memory management unit ("MMU") to manage a virtual address space, providing features such as virtual to physical address translation. A conventional MMU splits the virtual address space and physical address space into segments of memory called pages. Any page size may be chosen; however, typically a page size of 4 kilobytes to 32 kilobytes is used.

When a program running on a processing platform attempts to access a virtual memory address, the MMU attempts to facilitate the requested access, for example, by performing one or more of the following operations: (i) determining if the memory corresponding to the virtual memory address resides in the cache; (ii) translating the virtual memory address to a physical memory address; (iii) determining if the requesting process has sufficient privileges to access the referenced address; and (iv) determining whether the referenced memory is paged out to secondary storage. If the MMU is unable to provide access to the referenced memory address through translation to physical memory or through the cache, then a fault may be raised. If, for example, a page fault is raised because a requested virtual memory address is paged out to secondary storage, an error handler may simply load the page to physical memory and continue.

However, if the fault is caused by insufficient privileges or illegal requests, then the system may not be able to recover and a crash may occur. When a crash occurs various information may be stored for later debugging and analysis.

One problem with debugging a crash is a lack of information regarding the events that led to the crash. A programmer may only have information regarding the state of the platform at the time of the crash; however, the event that ultimately caused the crash may have occurred earlier. One solution to this problem is to configure a program to save certain state information every time a procedure is executed. While this technique may be effective, such debugging granularity creates significant overhead. For programs where timing may be important, the added overhead may disrupt such timing, hindering the debugging process. Accordingly, there is a need for an improved debugging technique that provides sufficient granularity to identify and correct problems without excessively increasing system overhead.

SUMMARY

Generally, there is disclosed a method for debugging that includes interacting with a memory management component to force an interrupt upon access to one or more memory locations during software execution. In response to the forced interrupt, information regarding the execution of the software is saved allowing interaction with the memory management component to disable the interrupt upon access to the one or more memory locations during software execution.

In some implementations, an interrupt handler initially and/or subsequently interacts with the memory management component to force interrupts. This interrupt handler may be executed upon the occurrence of an event, after a predetermined period of time, and the like.

When an interrupt occurs, debugging information is stored. This debugging information may include any information, including the time and/or date, the list of application(s) being executed, process information, the contents of registers and/or memory locations, stack contents, and the like. Such information may be used to automatically recover from a crash by restoring saved information and resuming execution.

Additionally, there is disclosed a system that includes a memory, a memory management component coupled to the memory, and a processor coupled to the memory management component. The processor is configured to facilitate debugging by interacting with the memory management component to force an interrupt upon access to one or more memory locations during software execution. In response to the forced interrupt, information regarding the execution of the software is saved to allow interaction with the memory management component to disable the interrupt upon access to the one or more memory locations during software execution.

The memory may be implemented using any technology including, random access memory, dynamic random access memory, synchronous dynamic random access memory, and the like. The memory management component provides an interface between the processor and the memory and may be implemented using a memory management unit, which may include a translation lookaside buffer to assist in mapping virtual address space to physical address space. The processor may be implemented using any technology including, a general-purpose microprocessor, an application-specific integrated circuit, a digital signal processor, and the like.

Furthermore, there is disclosed a method for capturing debugging information. The method includes enabling the capture of debugging information upon access to a portion of a memory, such as, for example, a memory address, a block of memory, a page of memory, and the like. Upon access to the portion of the memory, debugging information is saved and the capture of debugging information is disabled upon access to the portion of the memory. This method may be performed by an emulator to capture debugging information in a software and/or hardware emulator environment.

In some implementations, the capture of debugging information is periodically re-enabled (e.g., after an event occurs, after a predetermined amount of time elapses, and the like). If a predetermined time period is used, the time period may be adjusted to change the granularity of captured information. For example, a predetermined time period of less than one second may be used.

In another general implementation, a computer-readable medium includes software operable to facilitate debugging in a processing system. The software includes an interrupt enable component operable to force an interrupt upon access to one or more memory locations during software execution and a debugging information storing component operable to save information regarding the execution of the software in response to the forced interrupt so as to disable the interrupt.

In some implementations, the interrupt enable component and the debugging information storing component are each implemented using one or more interrupt handlers.

This software also may be used to facilitate automated crash recovery using an automated recovery component operable to restore saved information to prevent a fatal error. For example, when a fault occurs that would otherwise result in a fatal error, the system can restore to a previous state using saved debugging information.

The details of one or more implementations are set forth in the accompanying drawings and the description below. Other features and advantages will be apparent from the description and drawings, and from the claims.

DETAILED DESCRIPTION

One way to provide debugging information in a processor-based system is to periodically save debugging information based on memory access. For example, memory-handling information may be modified such that the processor-based system periodically invokes an error handling code. This error handling code saves debugging information and then performs whatever steps are necessary such that program execution can be resumed.

Figure 1:
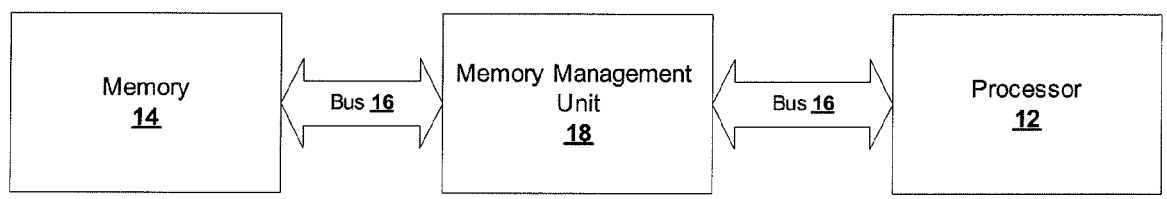
FIG. 1 is block diagram of a debugging device, having a processor, a memory management unit, and a memory.

Referring to FIG. 1, a device under test includes a processor 12 operable to access a memory 14 through one or more buses 16 using a memory management unit 18. Memory-handling information is modified to periodically force error handler invocation, upon which invocation, state information is stored to facilitate debugging. The granularity of error handling information may be modified by changing the frequency of error handler invocation and/or by changing the frequency that state information is saved upon such invocation.

The processor 12 may be implemented using any processing device, such as, for example, those found in general computing platforms and entertainment platforms (e.g., computers, video game consoles, portable video game devices, cell phones, personal digital assistants ("PDAs"), and the like). The memory 14 may be implemented using any data storage technology including, for example, random access memory ("RAM"), dynamic RAM ("DRAM"), synchronous DRAM ("SDRAM"), and the like. In some implementations, the memory 14 is formed of multiple memory modules, which may or may not each employee the same technology (e.g., the memory 14 may include multiple RAM modules and/or a DRAM or SDRAM cache). Furthermore, a cache may be implemented as a component of a memory management unit 18, as discussed below.

The processor 12, the memory 14, and the memory management unit 18 are coupled using one or more buses 16. In some implementations, a single bus 16 is used such that the processor 12, the memory 14, and the memory management unit 18 each communicate using the same bus 16. In additional implementations, separate buses are used between the memory management unit 18 and the processor 12, and between the memory management unit 18 and the memory 14. The debugging techniques described herein are independent of the bus 16 architecture. One skilled in the art will appreciate that any arrangement of buses 16, processor(s) 12, and memories 14 may be employed.

Furthermore, one skilled in the art will appreciate that the techniques disclosed herein may be used by a software and/or hardware emulator, which provides a virtual platform for executing programs. In an emulator, some or all portions of the system may be implemented in software to mimic the functionality of an emulated computing system. Thus, the entire environment shown in FIG. 1 may be provided by an emulator.

Figure 2:
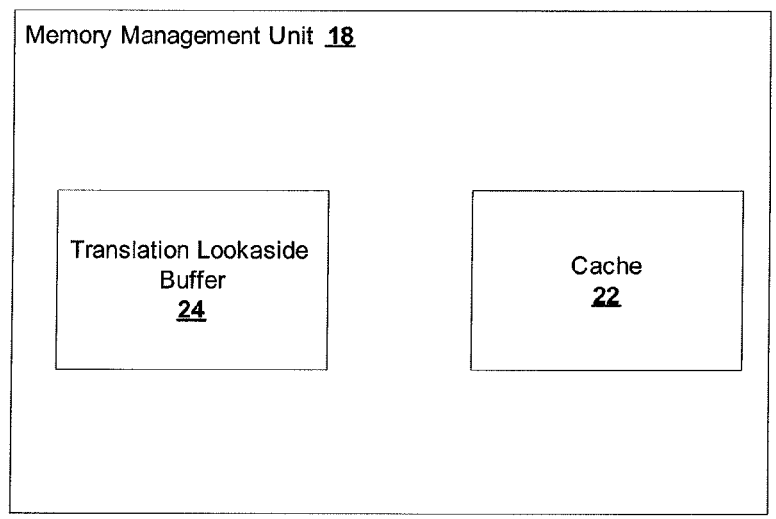
FIG. 2 is a block diagram of a memory management unit.

Referring to FIG. 2, some implementations of the memory management unit 18 include a cache 22 and a translation lookaside buffer 24. The cache 22 is implemented using any data storage technology and, typically, provides improved performance over the memory 14. The memory management unit 18 translates virtual addresses to physical addresses using a translation lookaside buffer ("TLB") 24, as discussed below in more detail with reference to FIG. 3.

Figure 3:
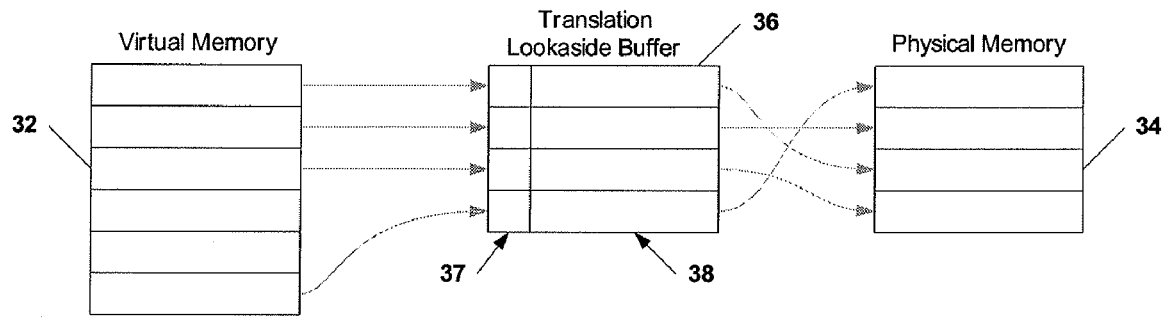
FIG. 3 is a diagram of virtual address space to physical address space mapping.

Referring to FIG. 3, the translation lookaside buffer ("TLB") 24 translates virtual addresses 32 to physical addresses 34 using TLB table 36. The TLB table 36 maintains entries for one or more virtual addresses 32, which include flags 37 and a physical mapping 38. To reduce the overhead of memory management, the memory management unit 18 typically operates on pages of data within virtual and physical address spaces (32 and 34), instead of individual memory addresses. Any page size may be employed, such as, for example, 1 kilobyte, 4 kilobytes, 16 kilobytes, or any other page size. The TLB table 36 includes one or more flags 37 used to maintain various information, such as, for example, whether an entry is valid, whether an entry is protected, whether an entry has changed, and the like.

Figure 4:
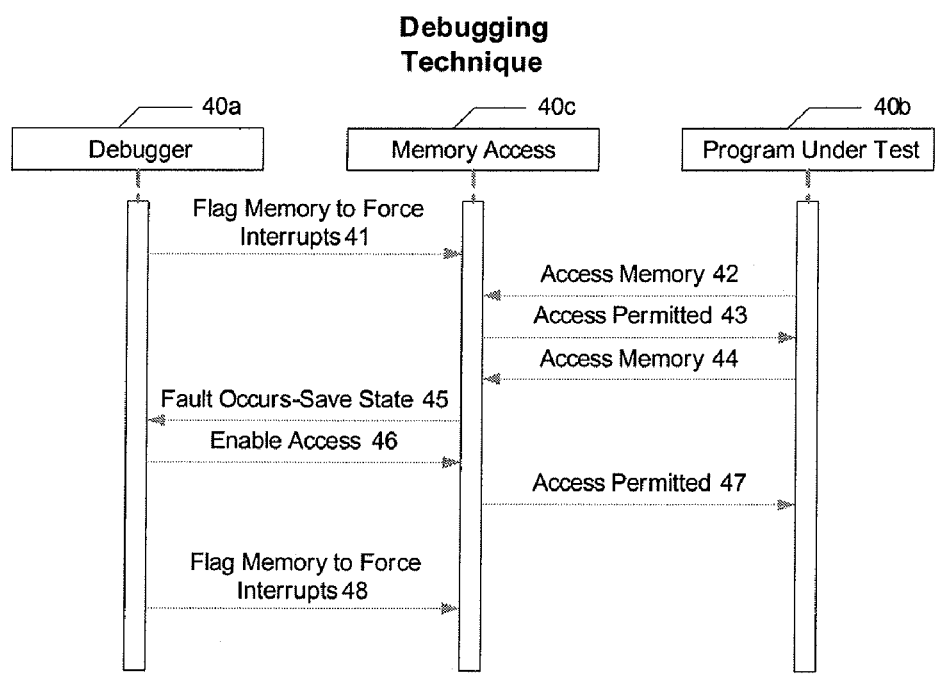
FIG. 4 is a sequence diagram of a debugging technique.

Referring to FIG. 4, one technique for providing debugging information in a processing system, such as that discussed above with respect to FIG. 1, is to include a debugging component 40a to capture information about a program under test 40b when such software attempts to read and/or write to memory using a memory access component 40c. The debugging component 40a flags memory to force interrupts (41). Typically the debugging component 40a is implemented in software and includes one or more interrupt handlers. A portion of the debugging component 40a may be implemented as a software application to allow a user, programmer, and/or system administer to selectively enable or disable debugging functionality. Memory may be flagged by the debugging software 40a either automatically, in response to a user request, or in response to an interrupt. For example, the TLB flags 37 may be set so as to force an interrupt by marking a TLB table 36 entry as read-only or otherwise protected.

The program under test 40b accesses a virtual memory address (42). If the virtual memory address that is requested is not flagged to force an interrupt, then the memory access component 40c permits access to the requested address and/or returns the contents of such address (43). If, however, a requested memory access (44) generates an interrupt, the debugging component 40a is activated. In some implementations, debugging software component 40a and interrupt handlers are not executed except in response to an interrupt forced by such component 40a. However, some implementations may execute such interrupt handlers more frequently. In this situation, it may be beneficial for the debugging software component 40a to determine the cause of the interrupt before taking further action.

When an interrupt occurs that is forced by the debugging software component 40a, the appropriate interrupt handler saves the current state (45) and enables access to the requested data (46). The memory access component 40c then permits access (47) to the program under test 40b. In some implementations, the debugging component 40a forces interrupts by interacting with the memory access component 40c to protect data, to mark the date as read-only, or to otherwise flag the data in such a way that an interrupt or other exception will be raised when the program under test 40*b* attempts to access (either read and/or write) a portion of the memory 14.

In one such implementation, a memory management unit 18 is configured to mark every page in memory 14 as read-only. When a program under test 40*b* attempts to write to a read-only memory location, a fault occurs and an exception handler is invoked. The exception handler saves certain debugging information, marks the requested page as read/write, and then allows execution to resume. Other memory locations within the page may be accessed and modified without raising an exception unless and until the page is again marked read-only.

Consider, for example, a program that writes to addresses, as shown in the following table:

| Address | Result |
|---|---|
| 0x10000 | Exception Raised |
| 0x10480 | |
| 0x11800 | Exception Raised |
| 0x12000 | Exception Raised |
| 0x13000 | Exception Raised |
| 0x13010 | |
| 0x13040 | Crash |

In this example, each page includes 4 kilobytes of addressable memory. To begin, each page is marked as read-only. With the first write to virtual address 0x10000, an exception is raised because the page is marked read-only. The exception handler saves debugging information, marks the page as read-write, and execution continues. The program then attempts to write to virtual address 0x10480. Because this address resides in the same page as 0x10000, the page is already marked as read-write and execution continues without exception handler invocation. Because each of the next three accesses reside in different pages marked read-only, each invokes the exception handling and debugging information is saved. Then, execution continues with the last two memory accesses. Because the page is already marked read-write, access to 0x13010 occurs normally; however, the access of address 0x13040 causes a crash.

Upon occurrence of a crash, the system dumps certain debugging information and program execution terminates. At this point, the system has saved debugging information four times. Accordingly, a debugger may be used to restore the system to any of the previous states and a programmer may analyze the code and its execution to attempt to identify the cause of the crash. Crashes may occur for many reasons, including, for example, insufficient access privileges, an illegal address, and the like.

In some embodiments, pages are periodically re-marked as read-only. This can be performed using an exception handler. For example, a watchdog timer may be used to raise an exception periodically. When the exception is raised, an exception handler then marks one or more pages as read-only. For example, an exception may be raised every 10 ms, every 50 ms, every 100 ms, every second, or at any other time interval. Each time the exception handler is invoked, some or all of the accessed pages may be marked read-only. Implementations may mark all pages read-only (including the ones already marked read-only), may mark changed pages read-only, may mark a subset of pages read-only, or the like. Some implementations perform maintenance functions, such as those described above, during system calls.

The techniques described herein also may be used to facilitate automated error recovery. Upon a crash or other unrecoverable exception, a program may be restored to a previous operable state using stored debugging information. Sometimes crashes may be caused by hardware errors that are unrelated (or at least non-deterministically related) to the program execution. In this case, simply restoring to a previous state may be sufficient to allow program execution to continue normally. In other instances, crashes are caused by software bugs. In these cases, a program may be restored to a previous state. If the program is interactive, it may be possible to avoid the interaction that caused the crash; however, there is a possibility that the crash will occur again.

Some implementations may provide for a multi-stage restore process whereby the most recently saved state is restored first. If a crash again occurs, then a previously saved state is restored. This process may continue until the user intervenes, or may automatically cease after a predetermined event or occurrence (such as, lapse of time, a predetermined number of repeated failures, and the like.).

In another implementation, the system simply saves program context every time a page fault occurs. This provides less granularity than the technique discussed above, but may be desirable for some debugging tasks.

The above implementations are described for purposes of example only; many additional variations are within the scope of this disclosure. For example, one skilled in the art will appreciate that exception handling may be invoked through mechanisms other than marking pages read-only.

What is claimed is:

1. In a computer system including an interrupt handler, a method comprising:
   the interrupt handler, in response to an interrupt occurring after a predetermined period of time, interacting with a memory management component to force an interrupt upon access to one or more memory locations during software execution; and
   in response to the forced interrupt, saving information regarding the execution of the software, and interacting with the memory management component to disable the interrupt upon access to the one or more memory locations during software execution.

2. A method for capturing debugging information, the method comprising:
   enabling the capture of debugging information upon access to a portion of a memory;
   upon access to the portion of the memory, saving debugging information and disabling the capture of debugging information upon access to the portion of the memory; and
   periodically reenabling the capture of debugging information upon access to the portion of the memory, wherein periodically reenabling the capture of debugging information is performed after a predetermined time interval.

3. A method for capturing debugging information, the method comprising:
   enabling the capture of debugging information upon access to a portion of a memory;
   upon access to the portion of the memory, saving debugging information and disabling the capture of debugging information upon access to the portion of the memory; and
   periodically reenabling the capture of debugging information upon access to the portion of the memory, wherein periodically reenabling the capture of debugging information is performed after a predetermined time interval that is less than one second.

* * * * *

UNITED STATES PATENT AND TRADEMARK OFFICE
CERTIFICATE OF CORRECTION

PATENT NO. : 7,689,868 B2
APPLICATION NO. : 11/767399
DATED : March 30, 2010
INVENTOR(S) : Brian Watson It is certified that error appears in the above-identified patent and that said Letters Patent is hereby corrected as shown below:

Column 3
In line 52, replace "employee" with --employ--

Column 6
In line 18, delete "." after "like"

Signed and Sealed this

Eleventh Day of May, 2010

David J. Kappos
*Director of the United States Patent and Trademark Office*